United States Patent [19]

Iwai et al.

[11] Patent Number: 5,093,549
[45] Date of Patent: Mar. 3, 1992

[54] LASER CUTTING MACHINE

[75] Inventors: Yasuhiko Iwai; Eikichi Hayashi, both of Aichi; Satoshi Nagamori, Osaka, all of Japan

[73] Assignee: Mitsubishi Denki K.K., Tokyo, Japan

[21] Appl. No.: 588,916

[22] Filed: Sep. 27, 1990

[30] Foreign Application Priority Data

Dec. 8, 1989 [JP] Japan .................................. 1-31775

[51] Int. Cl.⁵ ............................................. B23K 26/00
[52] U.S. Cl. .......................... 219/121.67; 219/121.78; 219/121.82; 219/121.74
[58] Field of Search ...................... 219/121.67, 121.72, 219/121.78, 121.82, 121.74, 121.75

[56] References Cited

U.S. PATENT DOCUMENTS

| 4,504,726 | 3/1985 | Hosakai et al. | 219/121.78 X |
| 4,532,402 | 7/1985 | Overbeck | 219/121.74 X |
| 4,678,889 | 7/1987 | Yamamaka | 219/121.74 X |
| 4,908,493 | 3/1990 | Susemihl | 219/121.72 X |
| 4,914,270 | 4/1990 | Copley et al. | 219/121.74 X |

Primary Examiner—C. L. Albritton
Attorney, Agent, or Firm—Sughure, Mion, Zinn, Macpeak & Seas

[57] ABSTRACT

A laser cutting machine in which a laser beam is condensed by a machining lens, and while the laser beam thus condensed is being applied to a workpiece, the laser beam and the workpiece are moved relative to each other, to cut the workpiece, the laser cutting machine comprising optical axis moving means for moving the laser beam applied to the machining lens in parallel with an optical axis to a desired position on the machining lens, and optical axis movement control means for controlling the optical axis moving means in conformance with a program provided for a cutting locus to control the relative movement of the condensed laser beam and workpiece, so that the laser cutting machine which is not expensive, and can form a cut in a workpiece in such a manner that the cut is not tapered in section, without lowering the machining accuracy is obtained.

11 Claims, 4 Drawing Sheets

LASER CUTTING MACHINE

BACKGROUND OF THE INVENTION

This invention relates to a laser cutting machine which can control the configuration of a section formed in a workpiece by a laser beam, and more particularly to a laser cutting machine in which a section formed in a workpiece by a laser beam is not tapered.

$CO_2$ lasers, YAG lasers, etc. have been put in practical use industrial for cutting operations. In general, in such a laser, a laser beam condensed by a machining lens is applied to a workpiece positioned near the focal point. Under this condition, the workpiece or the laser beam is moved to cut the workpiece.

FIGS. 5 and 6 are sectional diagrams showing examples of the configuration of sections formed in workpieces by a $CO_2$ laser beam according to a conventional method. In the case of FIG. 5, a metal workpiece (e.g. a soft steel plate about 9 mm in thickness) is cut; and in the case of FIG. 6, a non-metallic workpiece (e.g. a wooden workpiece about 20 mm in thickness) is cut.

A laser beam 2 from a laser oscillator is applied to a machining lens 3, so that it is condensed as indicated by the one-dot chain line. The laser beam thus condensed is applied to the metallic workpiece 4a or non-metallic workpiece 4b. In this connection, it is well known in the art that the following phenomena occur: In the case where a metallic workpiece 4a at least 4.5 mm in thickness is cut, its cut is tapered in section in such a manner that the cut width on the laser incidence side is larger with a taper angle of 1° to 2°. In the case of a non-metallic workpiece, its cut is tapered in section in such a manner that, in contrast with the case of the metallic workpiece 4a, the cut width on the laser incidence side is smaller.

The laser cutting method is generally employed in place of a method of machining thin plates using a turret punch press or the like. However, when used for forming mechanical parts of about 4.5 to 12 mm in thickness (particularly for forming gears or precision mechanical parts), the above-described tapered section may be an unacceptable. This difficulty is an obstruction to an increase of the range of application of the laser cutting method.

In order to overcome the above-described difficulty, a laser cutting machine has been proposed in which a laser beam is inclined and rotated by a three-dimensional laser cutting machine (see for instance Unexamined Japanese Patent Publication No. 174291/1985). In addition, a laser cutting machine has been proposed in which a machining lens is moved to incline the laser beam (see for instance Unexamined Japanese Patent Publication No. 5693/1989).

However, the former laser cutting machine suffers from difficulties that it is expensive, and it is difficult to provide a machining locus (or machining path) high in accuracy because the machine is intricate in mechanism and in control. The latter laser cutting machine is also disadvantageous in that, similarly as in the above-described laser cutting machine, it is expensive, and it is difficult to provide a machining locus high in accuracy, because generally in a laser machining operation it is necessary to jet machining gas from a nozzle coaxially with the axis of the concentrated laser beam.

SUMMARY OF THE INVENTION

Accordingly, an object of the invention is to eliminate the above-described difficulties accompanying a conventional laser cutting machine. More specifically, an object of the invention is to provide a laser cutting machine which is not expensive, and can form a cut in a workpiece in such a manner that the cut is not tapered in section, without lowering the machining accuracy.

The foregoing object of the invention has been achieved by the provision of a laser cutting machine in which a laser beam is condensed by a machining lens, and while the laser beam thus condensed is being applied to a workpiece, the laser beam and the workpiece are moved relative to each other, to cut the workpiece, which, according to the invention, comprises: optical axis moving means for moving the laser beam applied to the machining lens in parallel with the optical axis to a desired position on the machining lens; and optical axis movement control means for controlling the optical axis moving means in conformance with a program provided for a cutting locus to control the relative movement of the condensed laser beam and workpiece.

In the laser cutting machine, the optical axis moving means comprises two beam benders arranged in a laser beam transmission path from a laser oscillator to the machining lens so as to deflect the laser beam, the beam benders having reflecting mirrors which are moved by the optical axis movement control means.

Further, in the laser cutting machine, the optical axis moving means may be such that the laser oscillator is movable itself in parallel with the output optical axis.

With the laser cutting machine of the invention in which the laser beam condensed by the machining lens and the workpiece are moved relative to each other, the optical axis moving means operates to move the laser beam applied to the machining lens in parallel with the optical axis to a desired position on the machining lens. With respect to the amount of parallel movement of the laser beam, the optical axis movement control means controls the optical axis moving means in compliance with the program provided for a given cutting path. Hence, with the laser cutting machine of the invention, the sloped surface formed on a product by cutting a workpiece with a laser beam can be eliminated where the cut formed in the workpiece is otherwise tapered in section in such a manner that the cut width on the laser beam incidence side is larger, the laser beam is parallel-moved outwardly in the direction of the normal to the cutting line; and in the case where the cut formed in the workpiece is otherwise tapered in section in such a manner that the cut width on the laser beam incidence side is smaller, the laser beam is parallel-moved inwardly in the direction of the normal to the cutting line. In both cases, the product formed by cutting has a cut surface which is vertical, not sloped. This is due to the fact that, where a cutting line is maintained unchanged with respect to a cut to be formed, the machining point (focal point) is maintained unchanged even when the optical axis of the laser beam is moved in parallel with respect to the machining lens.

DETAILED DESCRIPTION OF THE PREFERRED EMBODIMENTS

Preferred embodiments of this invention will be described with reference to the accompanying drawings.

Figure 1:
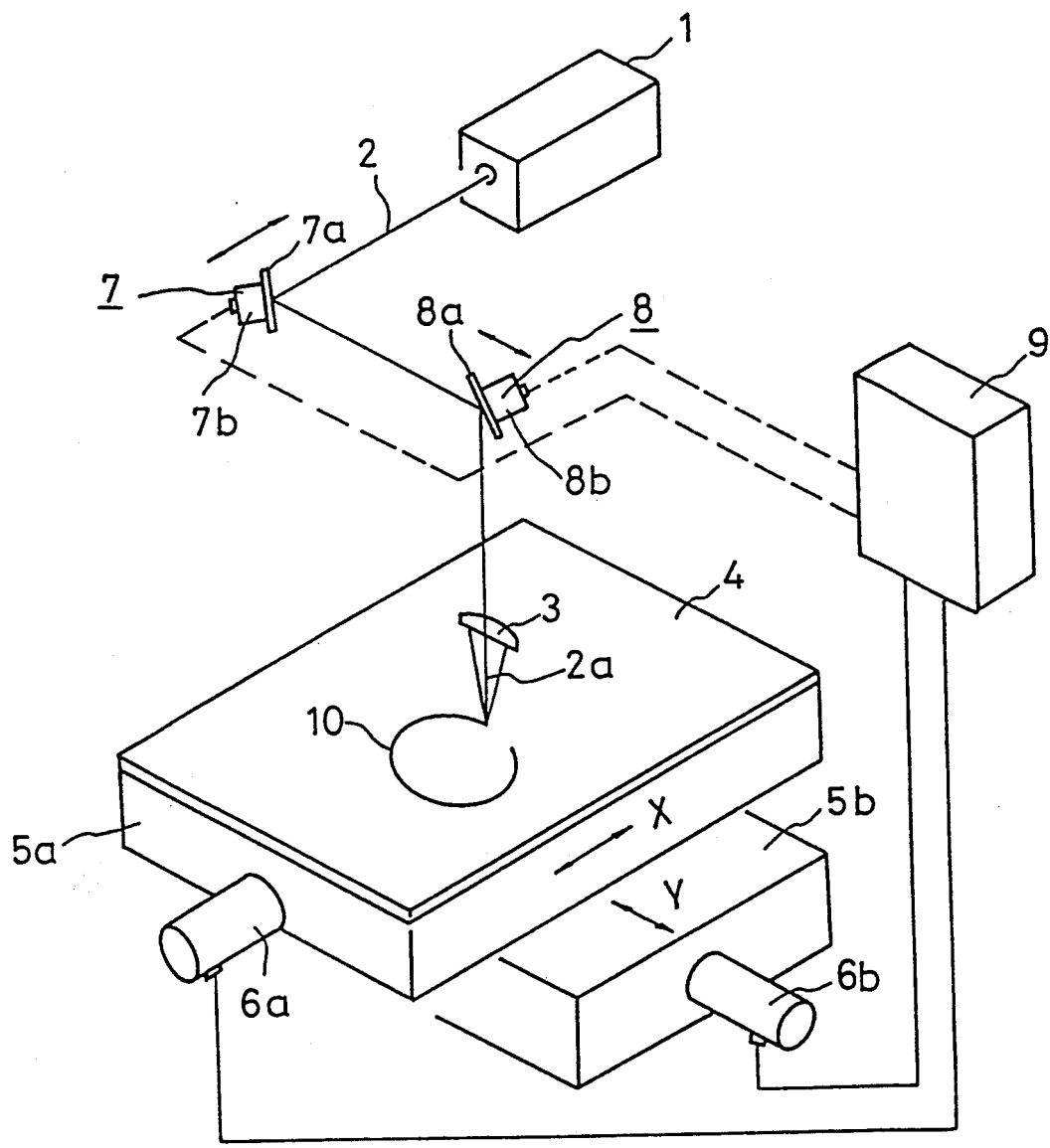
FIG. 1 is an explanatory diagram outlining the arrangement of one example of a laser cutting machine according to this invention.

FIG. 1 is an explanatory diagram outlining the arrangement of a laser cutting machine, a first embodiment of the invention. In FIG. 1, reference numeral 1 designates a laser oscillator; 2, a laser beam outputted by the laser oscillator 1; 3, a machining lens for condensing the laser beam 2 and applying the laser beam thus condensed to a workpiece 4, the machining lens 3 being fixed in a machining head (not shown); 5a and 5b, an X-axis drive table and a Y-axis drive table, respectively, on which the workpiece 4 is mounted, the X-axis drive table 5a and the Y-axis drive table 5b being moved relative to each other in X-axis and Y-axis directions driving the X-axis drive table 5a; and 6b, a servo motor for driving the Y-axis drive table 5b.

Further in FIG. 1, reference numerals 7 and 8 designate optical axis moving means, namely, beam benders provided in the path of the laser beam 2 from the laser oscillator 1 to the machining lens 3; 9, an NC (numerical control) unit; and 10, a cutting locus or cutting line. The beam benders 7 and 8 comprise reflecting mirrors 7a and 8a for deflecting the laser beam 2 forward the machining lens 3; and beam bender drive units 7b and 8b for linearly moving the reflecting mirrors 7a and 8a in the directions of the arrows, respectively. The NC unit 9 is a means for controlling the relative movement of the condensed laser beam 2a and the workpiece and a means for controlling the displacement of the optical axis. More specifically, in conformance to control instructions given to the servo motors 6a and 6b of the drive tables 5a and 5b, the NC unit 9 linearly moves the reflecting mirrors 7a and 8a of the beam benders 7 and 8, to displace the laser beam 2 in parallel with the optical axis of the machining lens 3.

Now, the operation of the laser cutting machine thus designed will be described. The laser beam 2 from the laser oscillator 1 is deflected by the beam benders 7 and 8 to the machining lens 3, where it is condensed. The laser beam 2a thus condensed is applied to the workpiece 4. In this operation, the drive tables 5a and 5b are moved according to a predetermined program in response to instructions provided by the NC unit 9, so that the laser beam 2a and the workpiece 4 are moved relative to each other, whereby the workpiece 4 is cut along the desired cutting line 10.

Figure 2:
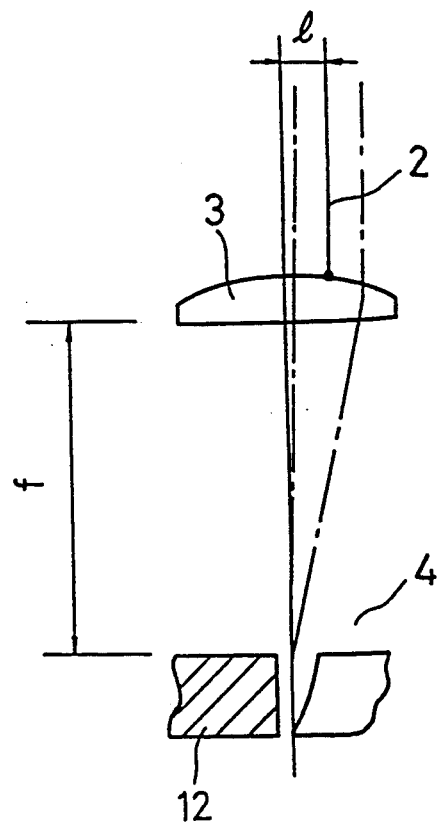
FIG. 2 is a sectional view showing a cut formed in a workpiece with the laser cutting machine of the invention.
Figure 3:
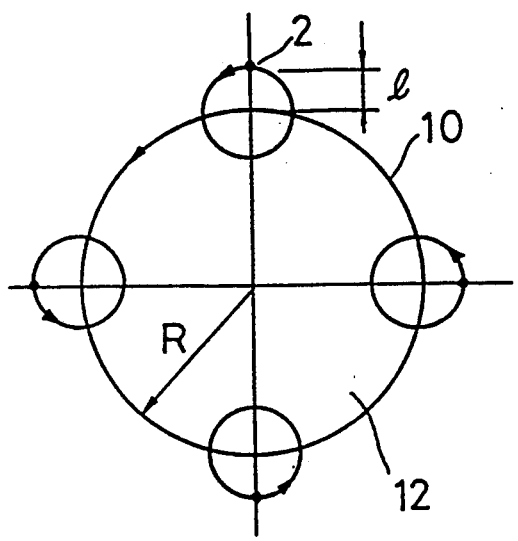
FIG. 3 is a plan view of the workpiece shown in FIG. 2.

In the case where the cutting line 10 is, for instance, a circle having a radius R, heretofore the resultant cut would be tapered in section in such a manner that the cut width on the laser beam incidence side is larger, thus degrading the quality of the product. This difficulty is eliminated according to the invention. That is, in this case, the laser cutting machine of the invention operates as follows:

As shown in FIG. 2, the laser beam 2 applied to the machining lens 3 is displaced in parallel with the optical axis, while, as shown in FIG. 3, it is moved along the cutting line 10 while being displaced a predetermined distance l from the cutting line 10 in the direction of the normal to the latter during a cutting operation. More specifically, in cutting a workpiece to form a circular product 12 having a radius R, the NC unit 9 outputs instructions to cause the drive tables 5a and 5b to operate in combination to move the laser beam along the cutting line 10, and applies a distance correction instruction to the beam bender drive units 7b and 8b in conformance with a predetermined circular locus program, to thereby operate the reflecting mirrors 7a and 8a. That is, the laser beam 2 is moved along the cutting line while being displaced in parallel with the optical axis and maintaining a distance l from the cutting line 10 radially outwardly of the circular product as shown in FIG. 3. As a result, as shown in FIG. 2, the cut surface of the resultant product 12 is vertical, not sloped; that is, the product is excellent in quality.

If a variety of correction distances l for the displacement of the laser beam in parallel with the optical axis are stored in the NC unit separately according to cutting conditions in advance, then they can be effectively used as parameters in machining programs.

In cutting a soft steel plate about 9 mm in thickness with a $CO_2$ laser, cutting proceeds at a rate of 1 cm/min with a laser output of 1000 Watts. In the case where a taper of 1° is corrected with a machining lens having a focal length f of 7.5 cm, the correction distance l may be set to 3.3 mm as a parameter.

In the above-described embodiment, the cutting line is a circle, and the cut is tapered in section with the cutting width on the laser beam incidence side being larger. However, the technical concept of the invention may be applied to any cutting line. That is, in the case of any cutting line, the same effect can be obtained by parallel displacement of the optical axis of the laser beam applied to the machining lens by a predetermined distance from the cutting line in the direction of the normal to the cutting line. In the case where the cut is tapered in section in such a manner that the cut width on the laser beam incidence side is smaller, and for instance the cutting line is a closed loop, the optical axis correction is made inwardly of the closed loop. In this case also, the same effect is obtained an the product formed by cutting the workpiece has a vertical cut side.

In the above-described embodiment, the condensed light beam and the workpiece are moved relatively to each other using the X-axis table and the Y-axis table; however, the same effect can be obtained with a workpiece moving system comprising a uni-axial light beam moving means and a uni-axial workpiece moving means, or a workpiece moving system having bi-axial light beam moving means.

Figure 4:
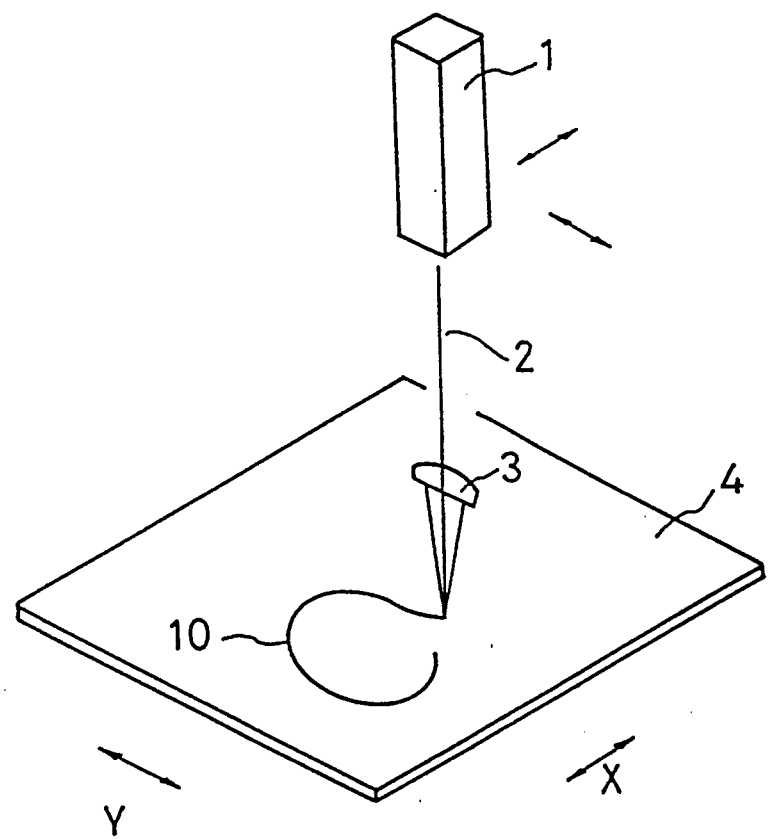
FIG. 4 is an explanatory diagram outlining the arrangement of another example of the laser cutting machine according to the invention.
Figure 5:
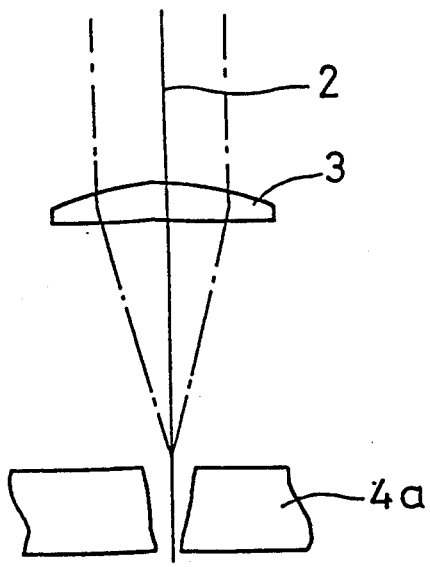
FIGS. 5 and 6 are sectional views of workpieces which are cut with a conventional laser cutting machine.
Figure 6:
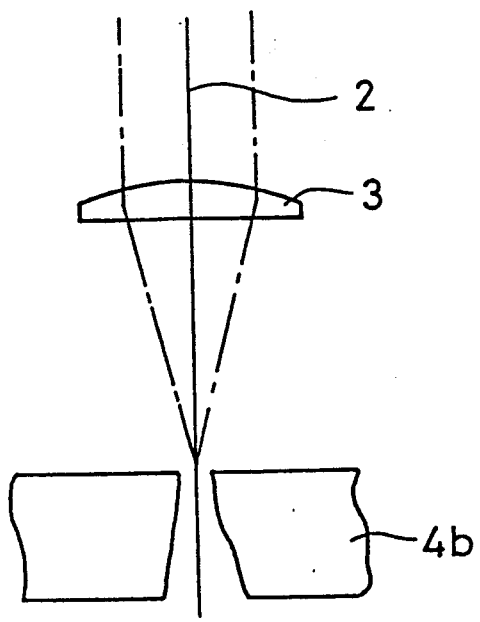

Furthermore, in the above-described embodiment, the optical axis is displaced by the reflecting mirrors disposed in the laser beam path from the laser oscillator to the machining lens. This method is suitable for a laser cutting machine in which the laser oscillator is heavy as in the case of a $CO_2$ laser. However, in a laser cutting machine in which the laser oscillator is small as in the case of a YAG laser, a method is preferably applied in which, as shown in FIG. 4, the laser oscillator itself is moved in parallel with the output optical axis.

As was described above, in a laser cutting machine in which a laser beam, concentrated using a machining lens, and a workpiece are moved relative to each other, according to the invention, an optical axis moving means operates to move the laser beam as applied to the machining lens in parallel with the optical axis to a desired position on the machining lens. An optical axis movement control means controls the amount of parallel movement of the laser beam in conformance with the program provided for a predetermined cutting line. Hence, the laser cutting machine according to the invention is simple in construction and low in manufacturing cost, and can perform a cutting operation with high precision; that is, a workpiece is cut accurately along a cutting line, the surface obtained as a result of the cutting operation is high in configuration accuracy.

What is claimed is:

1. A laser cutting machine in which a laser beam is condensed by a machining lens, and while said laser beam thus condensed is being applied to a workpiece, said laser beam and said workpiece are moved relative to each other, to cut said workpiece, said laser cutting machine comprising:

optical axis moving means for moving said laser beam as applied to said machining lens in parallel with an optical axis of said machining lens to a desired position on said machining lens shifted by a predetermined correction distance from said optical axis; and optical axis movement control means for controlling said optical axis moving means in conformance with a program provided for a cutting locus to control the relative movement of said condensed laser beam and workpiece so as to maintain a constant value of said correction distance as said optical axis follows said locus.

2. A laser cutting machine as claimed in claim 1, wherein said optical axis moving means comprises two beam benders arranged in a laser beam transmission path from a laser oscillator to said machining lens so as to deflect said laser beam, said beam benders having reflecting mirrors which are moved by said optical axis movement control means.

3. A laser cutting machine as claimed in claim 1, wherein said optical axis moving means includes a laser oscillator which is movable in parallel with the output optical axis.

4. A laser cutting machine for cutting a workpiece, said machine comprising;

laser beam generating means for generating a laser beam;

a machining lens for condensing said laser beam on said workpiece;

laser beam moving means for moving said laser beam relative to said workpiece in conformance with a program provided for a cutting locus to control the relative movement of said condensed laser beam and workpiece;

laser beam shifting means for shifting said laser beam applied to said machining lens in parallel with an optical axis to a desired position on said machining lens shifted by a predetermined correction distance from said optical axis; and laser beam shifting control means for controlling said laser beam shifting means in conformance with said program provided for said cutting locus, so as to maintain a constant value of said correction distance as said optical axis follows said locus.

5. A laser cutting machine as claimed in claim 4, wherein said laser beam moving means is selected from X—Y axes workpiece moving means, a uni-axial light beam moving means and a uni-axial workpiece moving means, and X—Y axes light moving means.

6. A laser cutting machine as claimed in claim 4, wherein said laser beam shifting means comprises two beam benders arranged in a laser beam transmission path from a laser oscillator to said machining lens so as to deflect said laser beam, said beam benders having reflecting mirrors which are moved by said laser beam shifting control means.

7. A laser cutting machine as claimed in claim 4, wherein said laser beam shifting means comprises means for moving said laser beam generating means in parallel with the output optical axis.

8. A laser cutting machine as claimed in claim 1, wherein said correction distance comprises a constant value measured from an incident point on said machining lens to said locus, along a line normal to said locus, said correction value being selected according to the material of said workpiece.

9. A laser cutting machine as claimed in claim 4, wherein said correction distance comprises a constant value measured from an incident point on said machining lens to said locus, along a line normal to said locus, said correction value being selected according to the material of said workpiece.

10. A laser cutting machine in which a laser beam is condensed by a machining lens, and while said laser beam thus condensed is being applied to a workpiece, said laser beam and said workpiece are moved relative to each other, to cut said workpiece, said laser cutting machine comprising:

optical axis moving means for moving said laser beam as applied to said machining lens in parallel with an optical axis of said machining lens to a desired position on said machining lens shifted by a predetermined correction distance from said optical axis, said optical axis moving means including a laser oscillator which is movable in parallel with said optical axis; and optical axis movement control means for controlling said optical axis moving means in conformance with a program provided for a cutting locus to control the relative movement of said condensed laser beam and workpiece.

11. A laser cutting machine for cutting a workpiece, said machine comprising;

laser beam generating means for generating a laser beam;

a machining lens for condensing said laser beam on said workpiece;

laser beam moving means for moving said laser beam relative to said workpiece in conformance with a program provided for a cutting locus to control the relative movement of said condensed laser beam and workpiece;

laser beam shifting means for shifting said laser beam as applied to said machining lens in parallel with an optical axis, to a desired position on said machining lens, said shifting means including means for moving said laser beam generating means in parallel with said optical axis; and laser beam shifting control means for controlling said laser beam shifting means in conformance with said program provided for said cutting locus.

* * * * *